United States Patent [19]

Normandin

[11] 3,964,447

[45] June 22, 1976

[54] VANE-TYPE ROTARY INTERNAL COMBUSTION ENGINE

[76] Inventor: Michel Normandin, 1328 Nelles, Ste-Foy, Quebec, Canada

[22] Filed: Aug. 12, 1974

[21] Appl. No.: 496,809

[52] U.S. Cl. ............................ 123/8.41; 418/94; 418/137; 418/151; 418/255
[51] Int. Cl.² ........................................ F02B 53/08
[58] Field of Search ................... 123/8.23, 8.41; 418/151, 255

[56] References Cited
UNITED STATES PATENTS

| | | | |
|---|---|---|---|
| 901,554 | 10/1908 | Pearson | 123/8.41 X |
| 904,974 | 11/1908 | Lee | 123/8.23 |
| 1,100,618 | 6/1914 | Raule | 123/8.41 |
| 1,116,471 | 11/1914 | Neumeyer | 123/8.23 |
| 1,619,429 | 3/1927 | Maillefer | 418/151 X |
| 2,046,873 | 7/1936 | Garrison | 418/255 |
| 2,114,674 | 4/1938 | Buckbee | 123/8.41 |
| 2,260,888 | 10/1941 | Davis | 418/255 |
| 2,314,056 | 3/1943 | Sobek | 418/151 |
| 3,858,559 | 1/1975 | Thomas | 123/8.41 |

FOREIGN PATENTS OR APPLICATIONS

| | | | |
|---|---|---|---|
| 836,423 | 10/1938 | France | 418/151 |
| 413,824 | 5/1946 | Italy | 418/151 |

Primary Examiner—Carlton R. Croyle
Assistant Examiner—Michael Koczo, Jr.
Attorney, Agent, or Firm—Cushman, Darby & Cushman

[57] ABSTRACT

The disclosure herein describes a vane-type rotary internal combustion engine which includes two separate housings, a compressor housing and a motor housing; each housing includes an interior profile of a first order configuration with constant diametrical chord. A rotor is rotatably mounted in each housing and includes a series of arc-shaped segments disposed in circular alignment in the housing and equally spaced to define therebetween a series of elongated radial openings. The rotor of each housing includes also a system of partially unbalanced vanes slidably mounted in these openings and bearing at each extremity thereof against the interior profile of the related housing; each vane defines in the housing chambers of variable volume depending on the relative rotational position of each segment with respect to the housing profile. Both housings are similarly structured with the exception that the compressor housing includes two sections of constant radius. Each housing includes also inlet and outlet means for the entry and exhaust of fluids.

15 Claims, 17 Drawing Figures

VANE-TYPE ROTARY INTERNAL COMBUSTION ENGINE

FIELD OF THE INVENTION

The present invention relates to a vane-type rotary internal combustion engine.

DEFINITIONS

Certain terms are used in the following disclosure and claims and a definition thereof is now given for a complete understanding thereof:

*generating circle*: a circle around which a configuration is established;

*symmetrical configuration of even order*: a configuration that reproduces a given pattern an even number of times around a generating circle;

*symmetrical configuration of odd order*: a configuration that reproduces a given pattern an odd number of times around a generating circle;

*symmetrical configuration of odd order with constant diametrical chord*: a symmetrical configuration of odd order in which the length of the chord going through the generating circle is a constant;

*totally unbalanced vane*: a single vane that moves around any configuration and remains in line with the chord going through the center of the generating circle; and

*partially unbalanced vanes*: a double vane system that moves around a configuration of odd order with constant diametrical chord; it is equivalent to two diametrically opposed single vanes or blades tied together by rigid rods along the chord.

BACKGROUND OF THE INVENTION

A symmetrical configuration of second order system is already in use for small high pressure pumps and it would first appear that such system could be used as a rotary internal combustion engine. However, the power required to move the totally unbalanced vanes and the amount of heat losses, due to the friction of the vanes on the casing or stator, are such that the system produces a very small amount of useful power.

Several systems are known where partially unbalanced vanes are used, some of which may be found described in U.S. Pat. No. 1,634,269 issued July 5, 1927, U.S. Pat. No. 1,977,780 issued Oct. 23, 1934, U.S. Pat. No. 2,013,916 issued Sept. 10, 1935 and U.S. Pat. No. 3,642,390 issued Feb. 15, 1972.

These systems use a third order configuration, or trilobic, housing around a circular rotor. Although the centrifugal action on the vanes and the heat losses on the housing may be significantly reduced, the power required to accelerate the double vanes a number of times around the generating circle is such that it precludes the utilization of any of these systems.

OBJECTS

It is an object of this invention to provide a rotary internal combustion engine which requires small power to move the partially unbalanced double vanes, even at high rotational velocities.

It is a further object of this invention to provide a rotary internal combustion engine of the vane type where the heat losses due to the centrifugal action of the vanes on the housing are considerably reduced.

Other objects and further scope of applicability of the present invention will become apparent from the detailed description given hereinafter; it should be understood, however, that the detailed description, while indicating preferred embodiment of the invention, is given by way of illustration only, since various changes and modifications within the spirit and the scope of the invention would become apparent to those skilled in the art from this detailed description.

SUMMARY OF THE INVENTION

These objects are accomplished according to the present invention by provision, in a vane-type rotary internal combustion engine, of a motor housing having an interior profile of a first order configuration with constant diametrical chord; a rotor rotatably mounted in the housing and including a series of arc-shaped segments disposed in circular alignment in the housing and equally spaced to define therebetween a series of elongated radial openings; a system of at least two partially unbalanced vanes slidably mounted in the openings and bearing at each extremity thereof against the interior profile whereby the constant diametrical chord is equal to the length of the vanes, each vane defining in the housing, between the interior profile and the segments, chambers of variable volume depending on the relative rotational position of each segment with respect to the housing profile; intake means for introducing a compressed gas mixture in one of the chambers; means for igniting the compressed gas mixture in the said one chamber; and exhaust means for discharging burnt gases from an other of the chambers.

In one preferred form of the new rotary internal combustion engine, there are provided means acting directly on the vanes to reduce the centrifugal and inertial forces as the latter increase. Advantageously, these means include circumferentially spaced groups of counterweights acting successively on one extremity of the vanes as the centrifugal and inertial forces increase on the opposite extremity thereof.

In the preferred form of the invention, the rotary internal combustion engine includes a separate housing with a rotor therein constructed substantially similar to that of the motor rotor. However, the interior profile of the compressor housing includes two sections of constant radius whereas the motor housing includes one half-section of increasing radius and one half-section of decreasing radius. Such compressor is found described in detail in my co-pending application Ser. No. 498,215 filed concurrently herewith.

DESCRIPTION OF PREFERRED EMBODIMENT

Referring in detail to the drawings, a preferred embodiment of a vane-type rotary internal combustion engine 100 includes a motor stage 102 and a compressor stage 104. The present invention is particularly concerned with the structure of the motor stage of the engine, the structure of the compressor stage being described in my above-mentioned co-pending application.

The motor stage 102 includes an outer stationary housing 112, or stator, and a central rotary portion 114, or rotor. The housing has an interior profile 116 which is monolobic, that is of a first order configuration with constant diametrical chord.

Profile 16 has a first section a-b-c-d which is of increasing radius and a second section d-e-f-a of decreasing radius.

Figure 3:
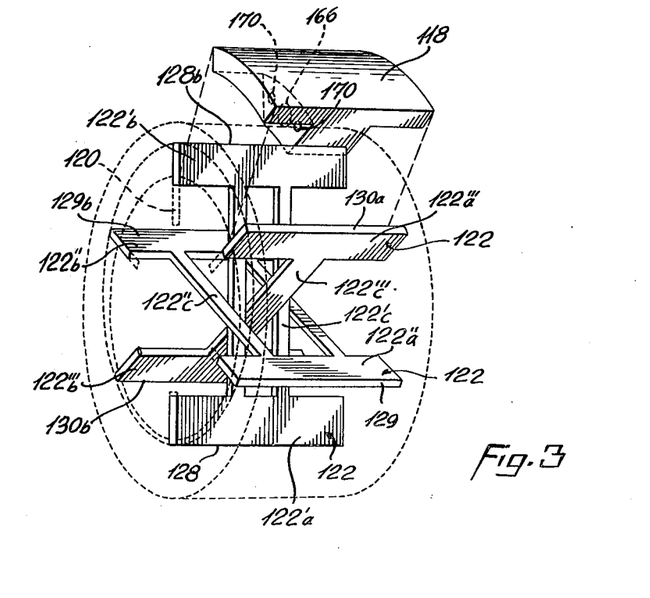
FIG. 3 is a perspective exploded view showing the interfitted vane arrangement of the rotors for both compressor and motor with one arc-shaped segment.
Figure 4:
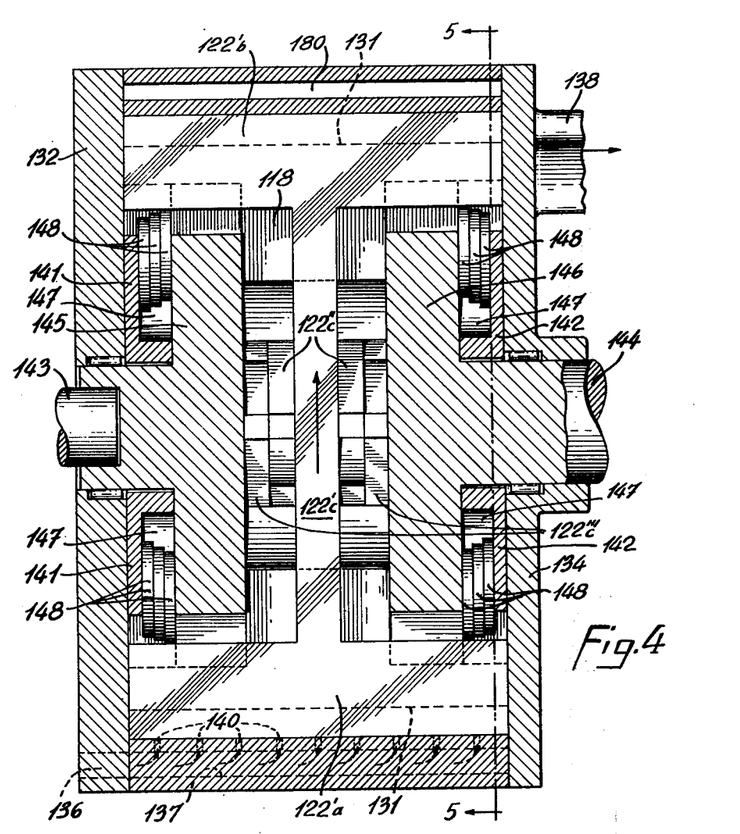
FIG. 4 is a longitudinal cross-section of the motor showing the vanes in position of equilibrium.

The rotor 114 is rotatably mounted in the housing and first includes a series of arc-shaped segments 118 (see FIG. 3) disposed in circular alignment in the housing. The segments are equally spaced from one another to define therebetween a series of elongated radial openings 120. Slidably mounted in these openings is a set of at least two partially unbalanced vanes 122, each vane having a length equal to the diametrical chord of the interior profile 116 of the housing. In the preferred embodiment, there are shown three partially unbalanced vanes 122', 122'', 122''' built in such a way that they interfit one another; they are either built from a single plate of metal or with two separate blades, such as blades 122'a–122'b, 122''a–122''b, 122'''a–122'''b joined together by appropriate rigid ties 122'c, 122''c, 122'''c, respectively. Each opposite extremity 128a–128b, 129a–129b, 130a–130b of the vanes bears against the interior profile 116 of the housing and thereby defines, between the interior profile 116 and the outer faces of the segments 118, chambers 131 of variable volume depending on the relative rotational position of each segment with respect to the housing profile.

Two end plates 132 and 134 close the opposite ends of the housing 112. An intake inlet 136 is provided in the end plate 132 for allowing the introduction of a compressed gas mixture in passageways 137 to one of the chamber, such as the chamber 131 between points a and b. Similarly, an exhaust outlet 138 may be provided in plate 134 for discharging the burnt gases from an other of the chambers 131, for example, in a sector defined from the mid-point of d–e to point f of the motor stage of FIG. 2.

In the form of the preferred embodiment, the partially unbalanced vanes 122 of the present system are greatly balanced with the addition of a counterweight action on the double vanes; this significantly reduces the vane pressure on the housing and provides high efficiency.

Referring to FIGS. 4–9 of the drawings, this counterweight action is accomplished by means of two circular rings 141 and 142 mounted adjacent the end plates 132 and 134, respectively. These rings are mounted co-axially to input and output shafts 143 and 144, respectively, which in turn terminate in the housing with circular plates 145 and 146, respectively. These plates are disposed between the tie rods 122'c, 122''c, 122'''c of the double vanes and the two circular rings 141 and 142. A series of cavities 147 are provided in each circular ring to receive a series of disc-shaped counterweights 148 (three being shown). The outer radial wall of each cavity is stepped, the number of steps corresponding to the number of discs in the cavity.

Figure 5:
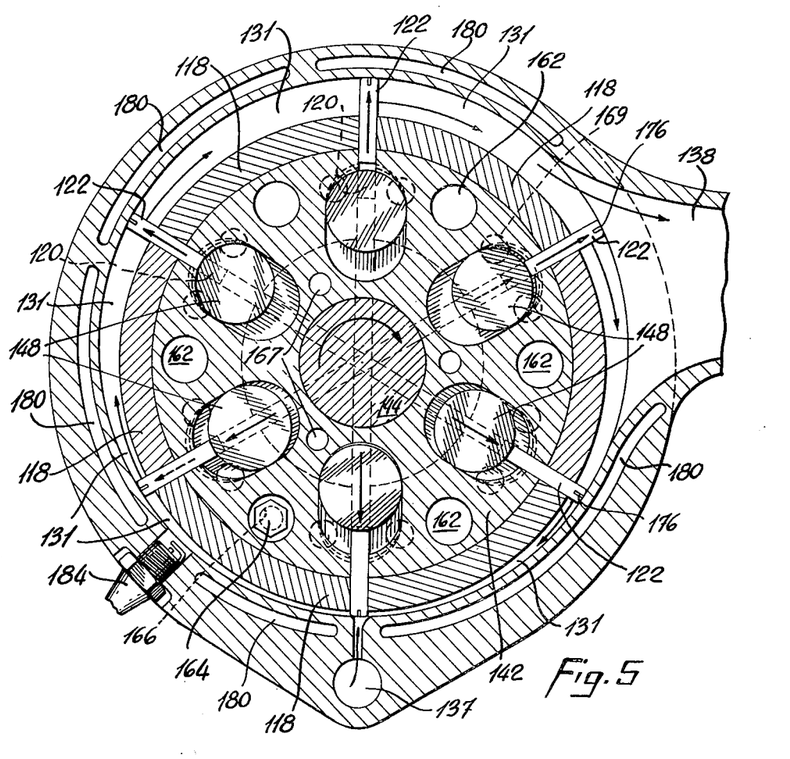
FIG. 5 is a transverse cross-section taken along lines 5—5 of FIG. 4.
Figures 6, 7, 8, 9:
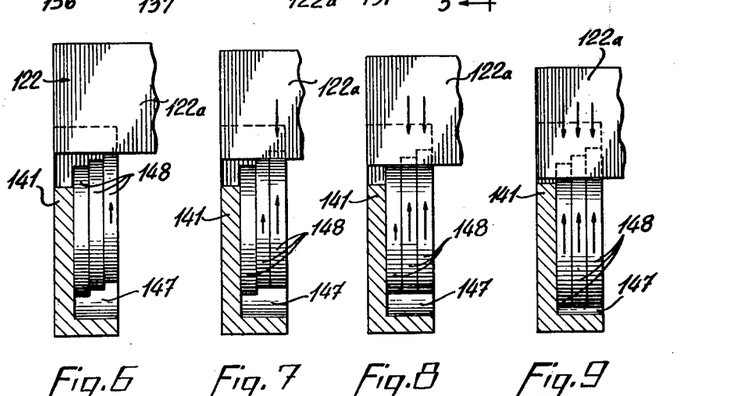
FIGS. 6 to 9 illustrate the gradual successive action of counterweight discs on the vanes.

A series of fastening means, one of which is shown as 164 in FIG. 5, secure the segments 118 to the plates 145 and 146, suitable openings 162 are provided in the circular discs 141 and 142 to allow passage of these fastening means in their proper position. Holes 167 are shown in disc 142 to receive fastening means therein for securing the circular discs 141 and 142 to the plates 145 and 146, respectively. Also, holes 169 and 170 are respectively provided in members 145–146 and 118 to receive appropriate guide pins (not shown) therein.

The action of the counterweights on the double vanes will now be described with reference to FIGS. 5 to 9. In its rotational movement, the rotor produces a radial alternative movement on the double vanes whose amplitude is equal to the difference between the maximum and the minimum heights of the chamber. When the double vane moves away from its neutral position, the vectorial sum of the centrifugal forces acting on the two blades is increased up to a maximum value and the resultant is in the direction defined by the blade farther from the center. This vectorial sum is drastically reduced with the addition of the circular discs which come successively in contact with the blade and act as linearly added counterweights.

In FIGS. 6–9, a downward movement of the vane 122 from its neutral position (FIG. 6) increases the centrifugal action on the blade 122a by the addition of the counterweights 148 whereas the effective mass of the opposite blade (not shown) of the blade decreases as the discs are successively refrained from pressing downwards on this opposite blade.

The inertia force produced on double vane by the radial movement of the vane system must be taken into account in the determination of the counterweights required to minimize blade pressure on the housing.

Instead of modifying the effective mass of the blade very rapidly and in a very short distance around the neutral position, counterweights may be added (or substracted) along the entire movement of the vane. Increasing the number of discs will reduce the shock between the discs and the blade.

Figure 10:
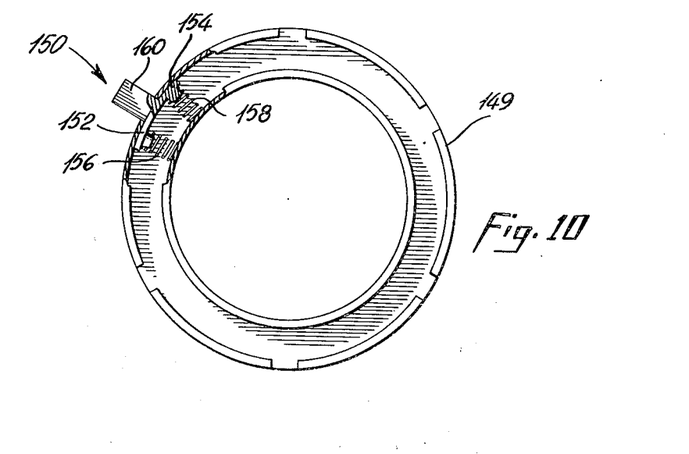
FIG. 10 shows an alternative form of counterweight means acting on the vanes.

Similar counterweight action may also be obtained if the rings 141 and 142 are substituted by pressure rings 149, such as illustrated in FIG. 10. A series of lugs 150 are mounted in the ring 149 and include two projections 152 and 154 which receive the ends of two springs 156 and 158, respectively; the opposite ends of the springs come into contact with the inner circumferential wall of the ring 149. The outer face 160 of each lug comes in contact with corresponding blades of the double vanes in the same way as the counterweight discs described above. The spring constant of the springs required to minimize the vane pressure on the housing is a function of the rotational speed of the rotor.

Figure 2:
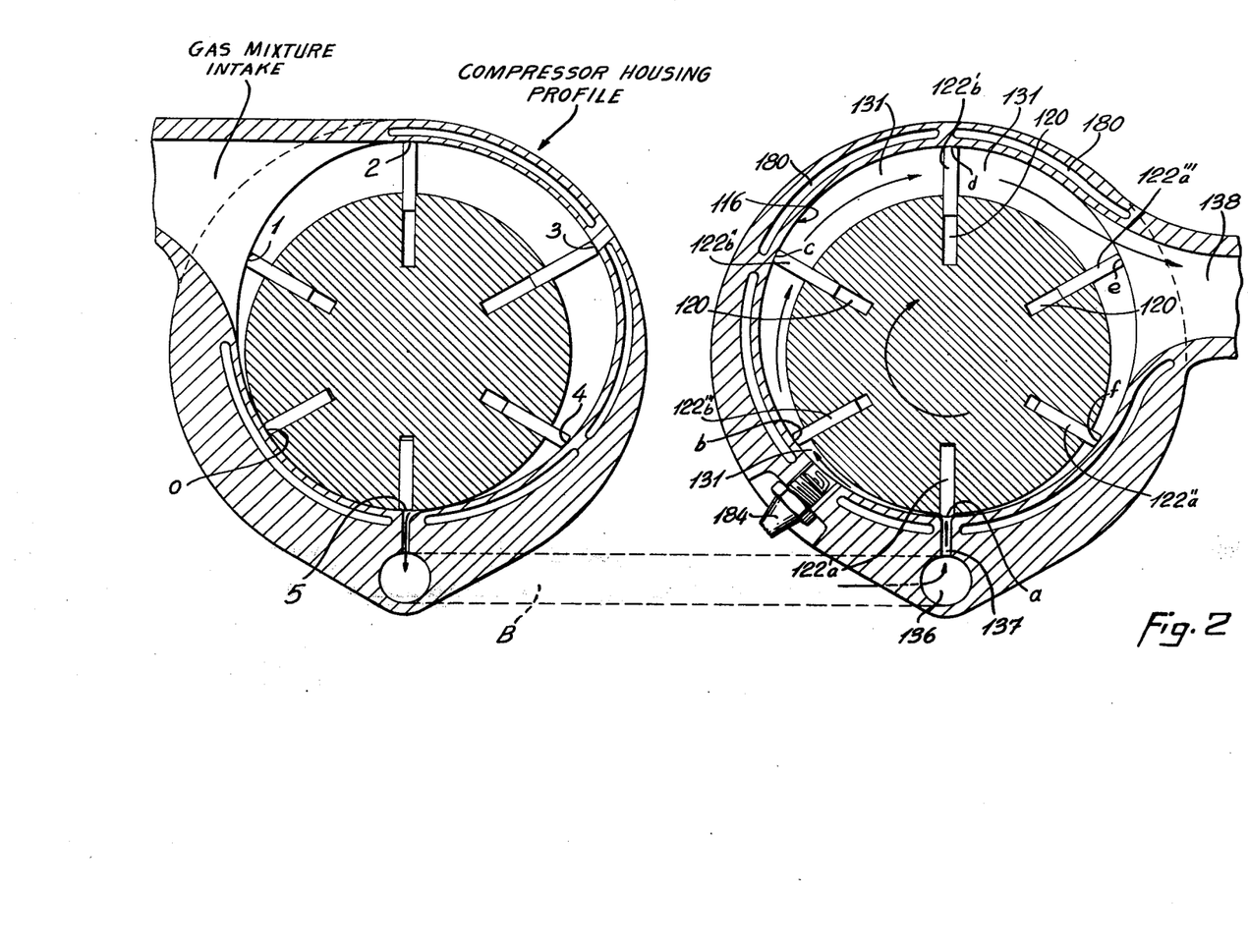
FIG. 2 is a diagram showing the relative interior positioning of the rotor with respect to the housing for both compressor and motor.

Ignition is obtained by the use of a rapid fire spark plug 184 located at an intermediate point between a and b of FIG. 2. Firing should be delayed until the vane has passed point a or the corresponding point of mixture injection in the motor. Also, more than one spark plug could be used on a fire line parallel to the rotation axis. With charge stratification, ignition is provoked inside the enriched portion of the mixture. It should be noted that the exterior cylindrical profile of the rotor can be slightly modified for every chamber in order to increase turbulence and to inhibit stratification of the charge in the combustion chamber.

Figure 13:
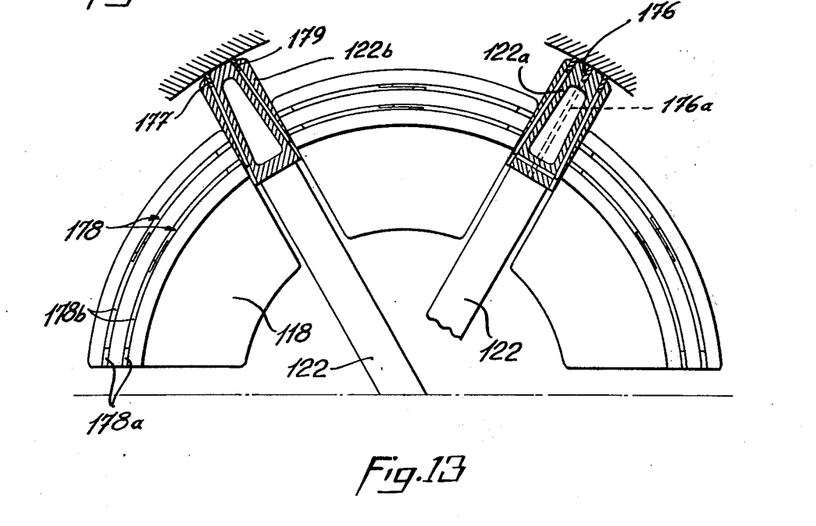
FIGS. 13, 14 and 15 show sealing arrangements for the motor stage.

Sealing of the motor stage is critical and, for this reason, the sealing arrangement adopted may be one as shown in FIG. 13 when a vane 122 has at one end thereof a tip 176 mounted at the extremity of the vane blade 122a. An alternative solution is also to provide two vane tips 177 and 179 as illustrated on the vane blade 122b. Such vane tips are represented in FIG. 14 wherein the centrifugal force acts on portion 176a while there may be provided a spring action 181 on portion 176b.

Figures 14, 15, 16, 17:
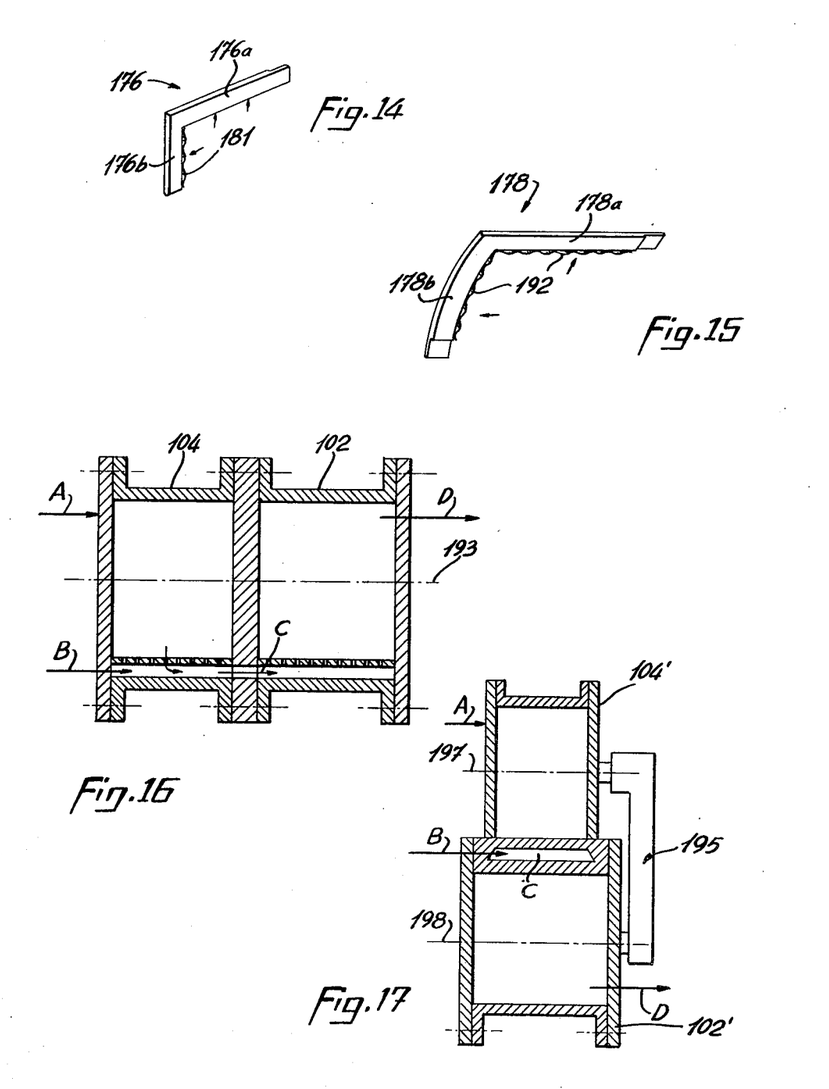
FIGS. 16 and 17 show two arrangements for coupling the compressor and the motor stages.

Referring to FIG. 13, the sides of the arc-shaped segments 118 include two rows of sealing ring segments 178 mounted therein; as illustrated in FIG. 15, both portions 178a and 178b are pressed against the housing of the motor by a spring action 192.

Adequate lubrication is essential and may be achieved by injecting oil in the central core of the rotor. Under the action of the centrifugal force, the oil seeps between the end plates and the rotor and between the vanes and the rotor. The housing is lubricated by the seepage of oil between the central segment and the vane, the oil being sent to the segment or ring slots through tiny weep holes drilled to the bottom of the blade. Evidently several other methods can be used to provide adequate lubrication.

Figures 11, 12:
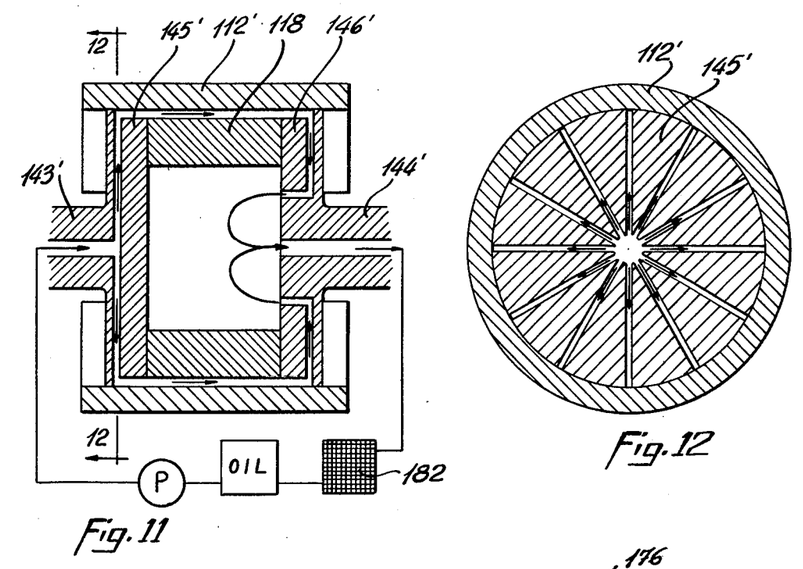
FIG. 11 is a schematic representation of one method of cooling the rotor cavity.
FIG. 12 is a cross-section along lines 12—12 of FIG. 11.

Depending on operational conditions, housing cooling may be achieved by an adequate water jacket 180 (FIG. 4) operating in conjunction with a heat-dissipating sub-system or by a suitable air cooling sub-system. A more intricate system must be used, however, to cool the rotor cavity. Because of the necessity of providing some means of oil circulation to lubricate the various moving parts of the motor stage an oil-cooling system may be adopted for the rotor and the rotor cavity. As shown in FIGS. 11 and 12, oil is circulated through the shaft 143' and the various parts of the rotor to the central cavity from where it is circulated via the output shaft 144' in a radiator 182 to cool it. The movement of the double vanes produces a high degree of turbulence in the rotor cavity and thus facilitates the heat exchange between the hot metal parts and the oil. FIG. 12 illustrates the positioning of the oil channels within the various rotor parts. Oil intake and exhaust may be assembled on the same shaft.

Figure 1:
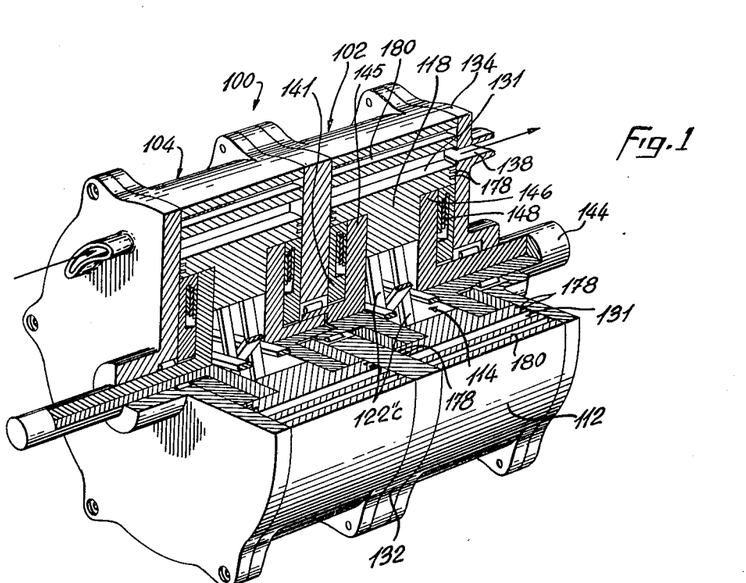
FIG. 1 is a perspective, partly cut away, view of a vane-type rotary internal combustion engine in accordance with the present invention.

As mentioned above, the compressor stage illustrated in FIGS. 1 and 2 is found described in my co-pending application referred to above. Structurally, the compressor is built similarly to the above disclosed motor with, however, a few changes. Evidently, the blades do not need to be as thick as those required in the motor stage. The housing of the motor stage includes two opposite sections of constant radius whose central angles are at least equal to $\pi/N$ where N is the number of vanes. The sealing of the compressor stage is less critical than the sealing of the motor stage. If further leakage reduction is required, a segment sub-system similar to the one illustrated in FIG. 13 may be adopted.

Similarly, good lubrication in the compressor housing is required; oil can be injected at a very slow rate through the rotor shaft. A centrifugal action will distribute this oil on both sides of the double vane, on the vane segments and on the compressor housing through very small weep holes in the vanes.

FIGS. 16 and 17 illustrate alternative ways of mounting the compressor to the motor wherein A represents an air-gas mixture intake, B a direct continuous fuel injection, C a compensation chamber and D a burnt gases exhaust. As described above, the compressor housing and a motor housing are shown mounted on the same rotation axis 193 (FIG. 16). However, in FIG. 17 the compressor and the motor are mounted parallel to one an other and a mechanical coupling 195 is provided between the two axes 197 and 198 to provide adequate timing between both systems.

Referring to FIG. 2 a compensation chamber B is mounted between the compressor and the motor. In the case of a parallel mounting as FIG. 17, the compressed gas mixture may be injected directly into the motor stage. However, a compensation chamber is preferable to significantly reduce large pressure fluctuation during the transfer. This chamber serves as a mixing chamber if the fuel is injected directly after a compression stage; in this case, the fuel is continuously injected and atomized in the chamber to insure proper mixing. The high temperature of the compressed air facilitates the evaporation of the fuel.

The compensation chamber, which has a given volume, smoothens up the flow of the compressed mixture from the compression chamber to the motor chamber. The cross-section of the chamber may be constant or may vary uniformly from a minimum at both ends of the system to a maximum at mid-point of the chamber. In a steady state regime, the volume of the chamber does not influence the compression ratio. Mean pressure in the chamber is a function of the final compression ratio.

A second compensation chamber may be added between the compressor and the motor to produce charge stratification. The system then requires the addition of a rotating or pulsating valve between one of the compensation chamber and the motor chamber and a fuel injector in one of the compensation chamber.

The rotating or pulsating valve cuts off the flow between one of the compensation chamber and the motor chamber for a specific fraction of the cycle.

In one alternative, air introduced in the compressor is compressed in both chambers. One of the compensation chamber is fitted with a fuel injector to produce a rich mixture which is continuously injected in the motor chamber. The other compensation chamber is fitted with a rotating or pulsating valve and the compressed air is injected in the latter part of the cycle to dilute the rich mixture in the trailing end of the motor chamber.

In the other alternative, a lean gas mixture is introduced in the compressor and compressed in both compensation chambers. One of the compensation chambers is fitted with a fuel injector and a rotating or pulsating valve while the other continuously injects its lean mixture in the motor chamber. The rotating or pulsating valve limits the injection of the rich mixture of the second compensation chamber to the ignition zone of the motor chamber.

Carburation may be external with a proper carburator before the intake to the compressor, or internal by continuous injection in the mixing chamber or by controlled discontinuous injection in the combustion chamber of the motor stage.

It is also possible to modify the compression ratio, the expansion ratio, the temperature and the pressure exhaust gases by varying the parameters of the system, such as the length of the rotor, the radius of the arc-segments and the height of the chambers. It is therefore possible to change the Otto cycle into a more efficient cycle where the thermal efficiency is higher.

The percentage of recirculated burnt gases can be changed at will by moving the position of the exhaust of the burnt gases. It is evident that this exhaust must be included in the sector defined from the mid-point of $d\text{-}e$ to point $f$ of the motor stage of FIG. 2.

What I claim is:

1. In a vane-type rotary internal combustion engine
   a motor stage including a motor housing having an interior profile of a first order of configuration with constant diametrical chord,
   a rotor rotatably mounted in said housing and including a series of arc-shaped segments disposed in circular alignment in said housing and spaced to define therebetween a series of elongated radial openings,
   a symmetrical system of unbalanced vanes slidably mounted in said openings and bearing at each extremity against said interior profile, said system including N vanes wherein N is an integer greater than 1, whereby said constant diametrical chord is equal to the length of said vanes, each of said vanes including a pair of blades disposed at 180° with respect to each other,
   each vane defining in said housing, between said interior profile and said segments, chambers of variable volume depending on the relative rotational position of each segment with respect to said housing profile,
   means mounted at opposite ends of said rotor associated with each blade of each individual vane and in line therewith for balancing the effect of centrifugal and inertial forces acting on said vanes,
   intake means for introducing a compressed gas mixture in one of said chambers,
   means for igniting said compressed gas mixture in said one chamber, and
   exhaust means for discharging burnt gases from another of said chambers.

2. In a rotary engine as defined in claim 1, wherein said means include a pair of circular rings, each ring being provided with radially spaced group of counterweights acting directly on said blades to minimize the effect of the centrifugal and inertial forces.

3. In a rotary engine as defined in claim 2, wherein said group of counterweights consist of a plurality of radially stepped discs.

4. In a rotary engine as defined in claim 1, wherein said means include circumferentially spaced spring biassed lugs acting on said blades.

5. In a rotary engine as defined in claim 1, wherein said vanes include at their opposite extremities sealing means for preventing leakage from one chamber to an adjacent chamber.

6. In a rotary engine as defined in claim 1, wherein said exhaust means include exhausting holes in said housing for the discharging of said burnt gases, said holes being disposed at the decreasing radius sector of said housing.

7. In a rotary engine as defined in claim 1, wherein said exhaust means include exhausting port in said end plate for the discharging of said burnt gases, said port being disposed between said rotor and said housing in the decreasing radius sector of said housing.

8. In a rotary engine as defined in claim 1, wherein said housing includes a pair of opposite end plates; said intake means being provided in one of said end plates and said exhaust means being provided in the other of said end plates.

9. In an engine as recited in claim 1, wherein N, the number of vanes, is an integer greater than two.

10. In an engine as recited in claim 1, said engine having a compressor stage in addition to said motor stage, said compressor stage comprising a compressor for compressing said gas mixture to said intake means, said compressor including
    a housing having an interior profile of a first order configuration with constant diametrical chord,
    a rotor rotatably mounted in said compressor housing and including a series of arc-shaped segments disposed in circular alingment in said compressor housing, said compressor segments being equally spaced to define therebetween a series of elongated radial openings,
    a symmetrical system of unbalanced vanes slidably mounted in said openings and bearing at each extremity against said interior profile, said system including N vanes wherein N is an integer greater than 1, whereby said constant diametrical chord is equal to the length of said vanes, each of said vanes including a pair of blades disposed at 180° with respect to each other,
    each said compressor vane defining in said housing, between said interior profile and said segments, chambers of variable volume depending upon the relative rotational position of each segment with respect to said housing profile,
    means mounted at opposite ends of said rotor associated with each blade of each individual compressor vane and in line therewith for balancing the effect of centrifugal and inertial forces acting on said vanes,
    intake means for introducing a compressible fluid in one of said compressor chambers, and
    exhaust means for discharging the compressed fluid from another of said chambers into said intake means of said motor stage.

11. In a rotary internal combustion engine as defined in claim 10, wherein the rotational axis of said compressor rotor is mechanically coupled to and synchronized with the rotational axis of said rotor of said motor stage, said axes being parallel.

12. In a rotary internal combustion engine as defined in claim 10, further comprising a compensation chamber disposed between said exhaust means of said compressor stage and said intake means of said motor stage.

13. In a rotary internal combustion engine as defined in claim 10, wherein said compressor housing profile includes two opposite constant radius sections having a central angle with a value equal to $\pi/N$ or less, where N is the number of vanes.

14. In an engine as recited in claim 10 wherein N, the number of vanes, is an integer greater than two.

15. In an engine as recited in claim 10 wherein the rotational axis of said compressor rotor is directly linked to and in line with said rotor of said motor stage.

* * * * *